United States Patent Office 3,141,035
Patented July 14, 1964

3,141,035
PROCESS FOR THE PREPARATION OF CHOLINE SALICYLATE
Emil Lorz and Richard S. Bagby, Springfield, Mo., assignors to Hoffman-Taff, Inc., Springfield, Mo., a corporation of Missouri
No Drawing. Filed July 17, 1961, Ser. No. 124,338
6 Claims. (Cl. 260—501)

The present invention relates to an improved process for the preparation of choline salicylate. This product has known uses as a pharmaceutical and, in particular, has been effectively employed as a substitute for aspirin.

This compound has been prepared by reacting choline base with salicylic acid in stoichiometric quantities to give a solution of the desired choline salicylate. Choline base, however, is difficult to prepare since it is unstable and it decomposes easily to trimethylamine and other products, thus giving an impure product and poor yields. Choline salicylate may also be prepared by the reaction of a suitable choline salt, such as choline bicarbonate with stoichiometric amounts of salicylic acid. This process has a disadvantage in that choline bicarbonate is more expensive to produce than the aforementioned choline base.

It is an object of the present invention to provide a simple economic process for preparing essentially pure choline salicylate in relatively high yields.

Another object of the invention is to prepare choline salicylate from compounds which are stable and readily obtainable.

Fundamentally, the process comprises the reaction of salicylic acid in an aqueous medium with a sufficient quantity of trimethylamine to yield a solution of trimethylamine salicylate according to the following reaction:

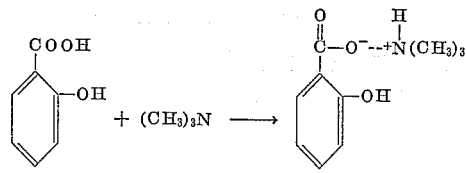

To the salt so obtained is then added ethylene oxide, whereupon the choline salicylate is formed according to the following equation:

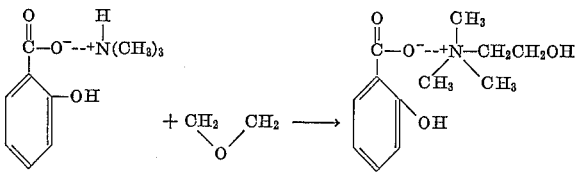

The trimethylamine is conveniently employed in water solution e.g., as a 25% solution, or more dilute. Since salicylic acid is practically insoluble in water, either the trimethylamine is added to a suspension of salicylic acid in water or the acid may be added as a solid to the trimethylamine solution. The amount of water used may be that necessary to provide an aqueous choline salicylate solution of the desired concentration for use as a pharmaceutical product. Additional quantities of water, as by the use of more dilute solutions of the reactants are permissible but may require the removal of water from the product to obtain a solution of the desired concentration.

Approximately stoichiometric proportions of the reactants are preferred for production of a pure product. If excess trimethylamine is used, a residual amine odor is present in the final solution and a high pH results. A slight excess of salicylic acid will eliminate the trimethylamine odor by the formation of trimethylamine salicylic salt. An excess of the ethylene oxide is undesirable since under either acidic or basic conditions, this is rapidly converted to ethylene glycol by the addition of water. Prior to adding the ethylene oxide, the pH of the solution may be adjusted to about pH 6. Use of no more ethylene dioxide than required to react with the trimethylamine salicylate will then result in formation of a substantially pure solution of choline salicylate without formation of ethylene glycol.

The reaction between trimethylamine and salicylic acid is exothermal and may proceed too rapidly unless it is controlled. This is accomplished by temperature control. Preferably, the temperature of the reaction at this stage is maintained below about 50° C. A temperature in the range of 30 to 50° C. is quite satisfactory, but the reaction will proceed slowly at room temperature. The ethylene oxide-trimethylamine salicylate reaction may be conducted at somewhat higher temperature, e.g., about 50 to 55° C. While the temperature limits for the two reactions are not critical, it is desirable to avoid excessive temperature rise. Thus, in a closed system, it is possible for excessive pressure to build up if the temperature is allowed to rise too high. Conventional heating and cooling means are employed.

The pH at which the reaction takes place is generally within the limits of 5.5 to 6.5, depending upon the proportions of reactants. With stoichiometric proportions, a pH of about 6.0 will prevail.

The choline salicylate is normally obtained in an aqueous solution, the concentration of which is controlled primarily by the amount of water used initially to disperse the salicylic acid or to dissolve the trimethylamine. The water solutions so obtained are sufficiently pure for use and may be marketed as standard 50% to 85% solutions, or any other concentration for which there may be a demand.

Solid choline salicylate may be obtained from the product solution by removing excess water by distillation, diluting the resultant syrup with a polar solvent, such as methanol, ethanol or isopropanol, and then precipitating the choline salicylate by the addition of a nonpolar solvent, such as ether benzene or ligroin. The mixture is chilled and the precipitated choline salicylate is filtered off and dried. Vacuum distillation, azeotropic distillation with a polar solvent, or a combination of both, may be used for the dehydration step.

The following examples illustrate the method for preparing choline salicylate:

Example 1

To 138 grams salicylic acid dispersed in 42 grams of water in a suitable reaction vessel are added, with agitation, 59 grams of trimethylamine. The temperature is maintained between about 30 to 50° C. but is not allowed to rise above 50° C. The reaction is complete when all of the salicylic acid has dissolved and the solution has a pH of about 6. Small amounts of acid or amine may be used to adjust the pH. When the pH has been adjusted to about 6, the mixture is heated to about 50 to 55° C. and 44 grams of ethylene oxide are added with agitation. The reaction mixture is maintained at about 50 to 55° C. for one hour, with agitation, after which it is cooled and filtered. The final solution may have a pH range of from 5.5 to 6.5, but is usually in the neighborhood of pH 6. The final solution obtained will contain approximately 85% by weight of pure choline salicylate solution and is water white. The yield is essentially quantitative.

Example 2

The reaction and materials used are identical to those given in Example 1, but the reaction is carried out in a sealed reaction vessel at a pressure of approximately 15 pounds per square inch gauge, in order to prevent the loss of ethylene oxide and trimethylamine which are rather volatile substances at room temperature.

*Example 3*

Fifty-nine grams of trimethylamine are added to 138 grams of salicylic acid and 241 grams of water by the method of Example 1. Forty-four grams of ethylene oxide are added and the reaction carried out by the method of Example 1 to give as a final product, 482 grams of choline salicylate solution containing 241 grams of choline salicylate equivalent to a 50% weight/weight solution.

*Example 4*

The reaction is carried out as in Example 1 and the resulting solution is concentrated by distilling off the water in vacuo. To the syrup so obtained there is added 100 ml. of isopropoyl alcohol and the resulting solution distilled, whereupon the water is removed azeotropically to give a viscous syrup essentially free of water. The syrup is dissolved in 125 ml. of dry acetone and absolute ethyl ether is added. The solution is chilled in a refrigerator, whereupon the choline salicylate crystallizes out. The crystals are filtered off, washed with a small amount of dry ether and dried in vacuo to give about 205 grams of choline salicylate melting at 49 to 51° C. A second crop may be obtained by concentrating the mother liquors and chilling.

We claim:

1. A method for preparing choline salicylate, comprising mixing trimethylamine with salicylic acid in aqueous medium in substantially equimolar proportions to produce a trimethylamine salicylate solution having a pH of approximately 6, then adding ethylene oxide to said solution in approximately equimolar amount with respect to said trimethylamine salicylate and reacting said ethylene oxide and trimethylamine salicylate to obtain a substantially pure aqueous solution of choline salicylate.

2. The method of claim 1 wherein the amount of water initially present is such as to directly produce a solution of choline salicylate of approximately 50% to 85% concentration.

3. The method of claim 1 wherein the aqueous solution of choline salicylate resulting from the reaction of the ethylene dioxide with trimethylamine salicylate is concentrated and choline salicylate in solid form is recovered by dissolution of the concentrate in an organic solvent followed by crystallization from such solvent.

4. The method of claim 3 wherein the aqueous solution of choline salicylate is concentrated by distillation, the concentrate is diluted by addition of a polar solvent, and choline salicylate is precipitated by the addition of a nonpolar solvent.

5. The method of claim 3 wherein said aqueous solution of choline salicylate is concentrated by vacuum distillation, remaining amounts of moisture are removed by azeotropic distillation of the concentrate with a polar solvent, the dehydrated mass is dissolved in acetone and choline salicylate is crystallized from such solution by the addition of ether followed by chilling.

6. A method for preparing choline salicylate, comprising reacting trimethylamine with salicylic acid in aqueous medium while maintaining the reaction temperature below about 50° C., the proportions of reactants being substantially stoichiometric to thereby produce a trimethylamine-salicylate solution having a pH of approximately pH 6, adding ethylene oxide to said solution in approximately the stoichiometric amount required for production of choline salicylate by reaction with said trimethylamine salicylate, and maintaining the temperature at approximately 50 to 55° C. until the reaction is complete and a substantially pure aqueous solution of choline salicylate is obtained.

References Cited in the file of this patent

UNITED STATES PATENTS

| | | |
|---|---|---|
| 2,774,759 | Blackett et al. | Dec. 18, 1956 |
| 2,803,651 | Whiston et al. | Aug. 20, 1957 |
| 2,870,198 | Klein et al. | Jan. 20, 1959 |
| 3,069,321 | Broh-Kahn et al. | Dec. 18, 1962 |

FOREIGN PATENTS

| | | |
|---|---|---|
| 379,260 | Great Britain | Aug. 25, 1932 |